V. E. VAN CANTFORT.
TIRE.
APPLICATION FILED APR. 18, 1908.
934,639.
Patented Sept. 21, 1909.
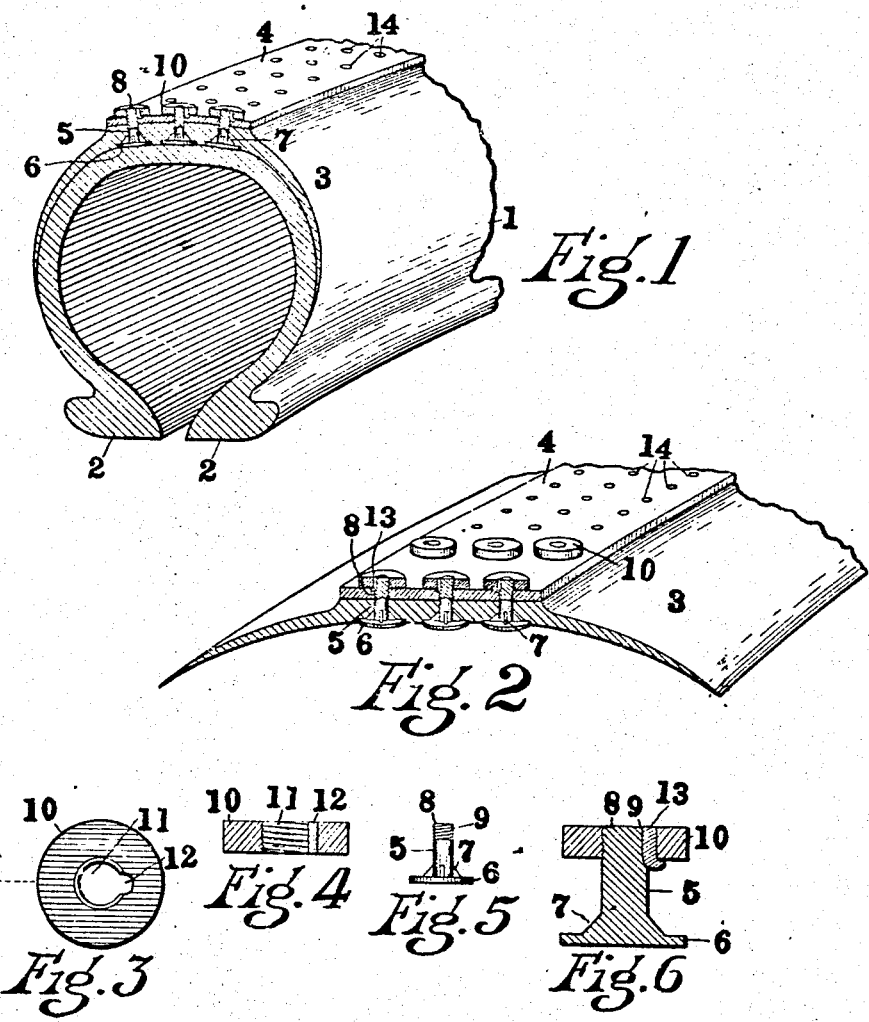
Witnesses:
Evelyn Blinn
Glenara Fox
INVENTOR—
Victor E. Van Cantfort
By C. E. Humphrey
ATTORNEY.

UNITED STATES PATENT OFFICE.

VICTOR EUGENE VAN CANTFORT, OF AKRON, OHIO.

TIRE.

934,639.

Specification of Letters Patent. Patented Sept. 21, 1909.

Application filed April 18, 1908. Serial No. 427,540.

*To all whom it may concern:*

Be it known that I, VICTOR EUGENE VAN CANTFORT, a citizen of the United States, residing at Akron, in the county of Summit and State of Ohio, have invented new and useful Improvements in Tires, of which the following is a specification.

This invention relates to elastic vehicle tires, more particularly tires of the double-tube pneumatic type.

The object of this invention primarily is to construct the outer casing of a double-tube pneumatic tire with a tread portion provided with means designed especially to prevent skidding and wear and incidentally to render the same as nearly puncture-proof as possible.

In carrying into effect the foregoing object this invention contemplates providing the tread portion of the casing with a covering of leather or equivalent wear-resisting flexible and semi-elastic material through which and a portion of the tire casing extend a plurality of bolts having threaded shanks projecting outwardly through the covering bearing nuts, preferably circular in contour constituting projections or protuberances on the tread of the tire to prevent skidding, secure increased traction, decrease the wear and prevent injury and puncture to the tire.

Other advantages constituting objects of this invention will more fully appear in the subjoined description.

A practical embodiment of this invention is illustrated in the accompanying drawings in which similar reference numerals indicate like parts in the different figures.

In the drawings: Figure 1 is a view in transverse section of the tire casing of a double-tube pneumatic tire constructed in accordance with this invention. Fig. 2 is a transverse sectional view of the tread portion of a tire detached, preparatory to mounting on the body of the tire casing. Fig. 3 is a plan of a nut used in connection with the bolts for preventing skidding. Fig. 4 is a sectional view of Fig. 3 on line X. Fig. 5 is a view in side elevation of a bolt employed, and, Fig. 6 is a sectional view enlarged showing the means for locking the nut on the bolt.

Referring to the drawings, 1 represents the outer tube or casing of a double-tube pneumatic tire constructed in the ordinary manner, provided with lateral beadings 2, 2, for engagement with the inturned edges of a clencher rim. As far as it concerns this invention any construction of tire casing may be employed and any desired form of fastening device used which is preferred, this invention having relation primarily to the tread portion thereof.

Adapted to be mounted on and united with the casing 1 and form therewith a unitary article is a tread 3 usually manufactured separately from the tire casing and after placement thereon united thereto by vulcanization. Secured to the outer surface of the tread 3 is a strip of flexible, wear-resisting, substantially non-elastic material 4 which if constructed of material which would be injured by the heat necessary to vulcanize the rubber of the tire must necessarily be placed thereon after the curing of the tire body. Extending through the body of the tread 3 are a plurality of bolts 5 having preferably flat heads with small wings 7 and a threaded shank 8. The tread portion of the shank 8 is provided with a flattened or grooved portion 9 for a purpose to be stated. Adapted to be mounted on the threaded portion of the shank 8 is a preferably flat circular nut 10 having a central threaded opening 11 united with which is a groove 12 extending through the threads in the nut. When the nut 10 is mounted on the shank 8 of the bolt 5 it is positioned so that the groove 5 will register with the flattened or grooved portion 9 of the shank, and into the opening formed by the registration of these two is driven a key 13 which locks under the nut 10 when in place, by reason of the fact that the inner end of the groove 9 in the shank 8 of the bolt 5 curves outwardly to meet the outer surface thereof, thus causing the point of the locking key 13 to be bent outwardly as it encounters the same, as clearly shown in Fig. 6.

In constructing a tire embodying this invention the casing 1 and tread 3 are manufactured separately and a plurality of openings are formed in the central portion of the tread through which are passed the shanks 8 of the bolts 5 leaving the head portions of the bolts on the inner face of the same and the outer threaded ends projecting beyond the outer periphery thereof. The tread is then placed upon the casing 1 and vulcanized thereto which firmly unites them into a unitary article with the shanks of the bolts projecting therefrom and the heads thereof firmly embedded in the wall of the tire and secured against revolution by means of the wings 7. A strip of leather or analogous material having suitable openings arranged to receive the extended ends of the bolts is then placed on the tread of the tire and pressed down sufficiently to cause the bolts to project therethrough. The nuts 10 are then screwed on the shanks of the bolts and secured by means of the locking keys 13 which effectually prevents their further rotation and holds them against unintentional displacement.

In view of the nature of the material of which the tread 3 and covering 4 are composed, the nuts may be readily positioned to bring the grooves 12 thereof into registering relation with the grooves 9 of the bolts, being yieldable sufficiently to permit this result. The protective covering 4 performs the two-fold function of not only protecting the tire against puncture but also protects the tread thereof from the wearing action of the nuts when moved by obstacles in the roadway. It will be apparent that if the protective covering 4 were not employed, the tread 3 previous to its placement on the casing 1 might be laid upon an anvil to support the ends of the bolts and the shanks thereto upset or riveted over the nuts or plain washers employed in place of the nuts, then after the tread is placed on the casing it could be vulcanized, but the employment of the protective strip 4 prevents this method of applying the tread, for the reason that the heat necessary to vulcanize the rubber in the tire would absolutely ruin the strip 4 and hence it must be placed upon the tread after the bolts have been positioned therein and the tire vulcanized. It is also further apparent that after vulcanization it is impossible to properly sustain the heads of the bolts 5 sufficiently to permit of the upsetting or riveting of the metal of the bolts to secure the nuts or washers thereon, due to the existence of the soft body of the casing 1 under the heads of the bolts. From this it will be seen that it is necessary to secure the nuts 10 in position by means which will not require upsetting of the metal thereof and which can be done without disturbing the position thereof or loosening them in the tire body.

From the foregoing it will be seen that in order to provide a tire casing with bolts having heads embedded therein and with their nuts or washers on the outer surface of the tire and at the same time provide the tread thereof with a protective covering of leather or equivalent flexible covering, the nuts and covering must be placed on the casing after vulcanization; and as it is impossible after vulcanization to upset or rivet the bolts for securing the nuts or washers in position, due to the softness of the casing body which offers no firm resistance to the action of riveting, the nuts must be secured on the bolts by some such means as a threaded engagement between the two and they must also be prevented from unscrewing or becoming loosened by some means such as a locking key or its equivalent. It will be pointed out that the foregoing construction will provide a tire having a covering on the tread thereof of leather or some suitable substance to resist wear, both from contact with the roadway and the wear incident to any slight movement of the bolts which are embedded in the tire casing and which serve to hold the nuts on the outer surface of the protective covering for preventing skidding of the tire.

Having thus described my invention, what I claim and desire to secure by Letters Patent, is:—

A tire comprising a body portion and a separate tread united thereto by vulcanization, said tread provided, previous to its vulcanization with a plurality of bolts having threaded shanks positioned in suitable apertures therein, extending from the inner face thereof outwardly and projecting therefrom, the heads of said bolts adapted to rest on the outer surface of the original tire body when said tread is united thereto, a strip of wear-resisting material positioned on the outer surface of said tread after vulcanization constituting a protective covering therefor, nuts adapted to be secured on the threaded ends of said bolts to engage said protective covering, thereby maintaining the same in snug engagement with said tread and constituting protuberances for receiving the wear and preventing skidding of said tire and means extending longitudinally of said bolts for locking said nuts thereon, whereby said nuts are locked against rotation irrespective of the wear thereon.

In testimony whereof I have hereunto set my hand in presence of two subscribing witnesses.

VICTOR EUGENE VAN CANTFORT.

Witnesses:
C. E. HUMPHREY,
GLENARA FOX.